(12) United States Patent
Garg et al.

(10) Patent No.: US 9,298,671 B2
(45) Date of Patent: *Mar. 29, 2016

(54) LEARNING REWRITE RULES FOR SEARCH DATABASE SYSTEMS USING QUERY LOGS

(75) Inventors: Dinesh Garg, New Delhi (IN); Monu Kedia, New Delhi (IN); Sriram Raghavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 13/600,915

(22) Filed: Aug. 31, 2012

(65) Prior Publication Data

US 2013/0262351 A1 Oct. 3, 2013

Related U.S. Application Data

(63) Continuation of application No. 13/434,136, filed on Mar. 29, 2012, now Pat. No. 9,043,248.

(51) Int. Cl.
| | |
|---|---|
| *G06F 15/18* | (2006.01) |
| *G06N 5/02* | (2006.01) |
| *G06F 17/30* | (2006.01) |
| *G06K 9/62* | (2006.01) |
| *G06N 99/00* | (2010.01) |
| *G06Q 10/10* | (2012.01) |
| *G06Q 30/02* | (2012.01) |

(52) U.S. Cl.
CPC .......... *G06F 15/18* (2013.01); *G06F 17/30672* (2013.01); *G06K 9/6256* (2013.01); *G06K 9/6269* (2013.01); *G06N 5/025* (2013.01); *G06N 99/005* (2013.01); *G06Q 10/10* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,544,355 A * | 8/1996 | Chaudhuri et al. | |
| 6,169,986 B1 | 1/2001 | Bowman | |
| 7,254,774 B2 | 8/2007 | Cucerzan et al. | |
| 7,818,315 B2 | 10/2010 | Cucerzan | |
| 7,979,415 B2 | 7/2011 | Shen | |
| 8,005,842 B1 | 8/2011 | Pasca et al. | |
| 8,055,669 B1 | 11/2011 | Singhal et al. | |
| 8,065,316 B1 | 11/2011 | Baker et al. | |
| 9,043,248 B2 * | 5/2015 | Garg et al. | 706/12 |
| 2004/0249808 A1 | 12/2004 | Azzam | |
| 2006/0129915 A1 | 6/2006 | Chan | |
| 2006/0224579 A1 | 10/2006 | Zheng | |
| 2007/0038600 A1 * | 2/2007 | Guha | 707/3 |
| 2008/0082477 A1 | 4/2008 | Dominowska et al. | |
| 2008/0147637 A1 * | 6/2008 | Li et al. | 707/5 |
| 2009/0198644 A1 * | 8/2009 | Buchner et al. | 707/2 |

(Continued)

OTHER PUBLICATIONS

Zhang et al, "Comparing Click Logs and Editorial Labels for Training Query Rewriting", WWW2007, May 8-12, 2007, Banff, Canada.*

(Continued)

*Primary Examiner* — Stanley K Hill
*Assistant Examiner* — Ilya Traktovenko
(74) *Attorney, Agent, or Firm* — Ference & Associates LLC (57) ABSTRACT

Methods and arrangements for conducting a search using query logs. A query log is consulted and query rewrite rules are learned automatically based on data in the query log. The learning includes obtaining click-through data present in the query log.

14 Claims, 5 Drawing Sheets

(56) References Cited

U.S. PATENT DOCUMENTS

| | | | | |
|---|---|---|---|---|
| 2009/0265328 | A1* | 10/2009 | Parekh et al. | 707/5 |
| 2010/0094854 | A1* | 4/2010 | Rouhani-Kalleh | 707/706 |
| 2010/0179948 | A1 | 7/2010 | Xie et al. | |
| 2010/0257150 | A1* | 10/2010 | Lu et al. | 707/713 |
| 2011/0125730 | A1 | 5/2011 | Bordawekar et al. | |
| 2011/0295854 | A1* | 12/2011 | Chiticariu et al. | 707/737 |
| 2011/0314000 | A1* | 12/2011 | Chaudhuri et al. | 707/718 |

OTHER PUBLICATIONS

Croft, "Query Evolution", W.B.Croft, 2009.*
Pirahesh et al, "Extensible/Rule Based Query Rewrite Optimization in Starburst", 1992 ACM SIGMOD—Jun. 1992/CA, USA.*
Raghavan et al, "Complex Queries over Web Repositories", Proceedings of the 29th VLDB Conference, Berlin, Germany, 2003.*
Riezler et al, "Query Rewriting Using Monolingual Statistical Machine Translation", Journal Computational Linguistics, vol. 36 Issue 3, Sep. 2010, pp. 569-582, MIT Press Cambridge. MA. USA.*
Shekhar et al, "Learning Transformation Rules for Semantic Query Optimization: A Data-Driven Approach", IEEE Transactions on Knowledge and Data Engineering, vol. 5. No. 6., Dec. 1993.*
Siegel et al, "A Method for Automatic Rule Derivation Support Semantic Query Optimization", ACM Transactions on Database Systems, vol. 17, No. 4, Dec. 1992, pp. 563-600.*
Szpektor, Idan, et al., "Improving Recommendation for Long-tail Queries via Templates," Proceedings of the 20th International Conference on World Wide Web (WWW 2011), Session: Recommendation, Hyderabad, India, Mar. 28-Apr. 1, 2011, pp. 47-56, ACM, New York, New York, USA.
Sadikov, Eldar, et al., "Clustering Query Refinements by User Internet," Proceedings of the 19th International Conference on World Wide Web (WWW'10), Raleigh, North Carolina, USA, Apr. 26-30, 2010, 10 pages, ACM, New York, New York, USA.
Zhang, Wei Vivian, et al., "Query Rewriting using Active Learning for Sponsored Search," SIGIR'07 Proceedings of the 30th Annual International ACM SIGIR Conference on Research and Development in Information Retrieval, Amsterdam, The Netherlands, Jul. 23-27, 2007, 2 pages, ACM, New York, New York, USA.
Agarwal, Ganesh, et al., "Towards Rich Query Interpretation: Back and Forth on Mining Query Templates," Proceedings of the 19th International Conference on World Wide Web (WWW 2010), Raleigh, North Carolina, USA, Apr. 26-30, 2010, 10 pages. Copy can be found online at https://agora.cs.illinois.edu/ . . . /templatemining-www10-akc-nov09.pdf as of Jul. 13, 2012.
Zhuang, Ziming, et al., "Re-Ranking Search Results Using Query Logs," CIKM '06 Proceedings of the 15th ACM International Conference on Information and Knowledge Management, Arlington, Virginia, USA, Nov. 6-11, 2006, 2 pages, ACM, New York, New York, USA.
Jain, Vidit, et al., "Learning to Re-Rank: Query-Dependent Image Re-Ranking Using Click Data," Proceeding of the 20th International Conference on World Wide Web (WWW 2011), Hyderabad, India, Mar. 28-Apr. 1, 2011, 10 pages, ACM, New York, New York, USA.
Croft, "Query Evolution", W.B. Croft, 2009.
Riezler et al, "Query Rewriting Using Monolingual Statistical Machine Translation", Journal Computational Linguistics, vol. 36, Issue 3, Sep. 2010, pp. 569-582, MIT Press Cambridge, MA, USA.
Shekhar et al, "Learning Transformation Rules for Semantic Query Optimization: A Data-Driven Approach", IEEE Transactions on Knowledge and Data Engineering, vol. 5, No. 6., Dec. 1993.

* cited by examiner

LEARNING REWRITE RULES FOR SEARCH DATABASE SYSTEMS USING QUERY LOGS

CROSS REFERENCE TO RELATED APPLICATION

This application is a continuation of U.S. patent application Ser. No. 13/434,136, entitled LEARNING REWRITE RULES FOR SEARCH DATABASE SYSTEMS USING QUERY LOGS, filed on Mar. 29, 2012, which is incorporated by reference in its entirety.

BACKGROUND

The phenomenal success of Internet-based search engines has afforded considerable access to information via keyword queries. As a consequence, users of modern IR (information retrieval) systems (both Internet and as well as Intranet) are coming to demand access to a great variety of types of heterogeneous information, including semi-structured and unstructured documents, also referred to as "deep web", through simple keyword queries.

In employing a simple keyword query-based search over a vast proliferation of heterogeneous information sources, some fundamental challenges are encountered, warranting new or revised approaches for search and information retrieval. One attempted solution encompasses analyzing both search queries and indexed documents by use of auxiliary data such as concepts embedded within them. In such a scenario, auxiliary data permit the engine to better interpret the search query terms and retrieve documents matching the "intent" behind the query, as opposed to documents that merely contain physical matches for the query terms. For example, a query such as "nyc map" can elicit an actual map of New York City.

The efficacy of such an auxiliary data-based approach lies in answering questions such as the following effectively: How to populate the library of the concepts? How to populate the library of instances for different concepts? How to represent a given query and/or documents through other templates that are derived using these concepts? How to leverage these templates to answer a query in an effective manner? To date, conventional efforts have not effectively addressed these and other questions in a manner that scales well or lives up to expectations of intent-based search (as opposed to keyword-based search).

BRIEF SUMMARY

In summary, one aspect of the invention provides a method comprising: consulting a query log; and automatically learning query rewrite rules based on data in the query log; said learning comprising obtaining click-through data present in the query log.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
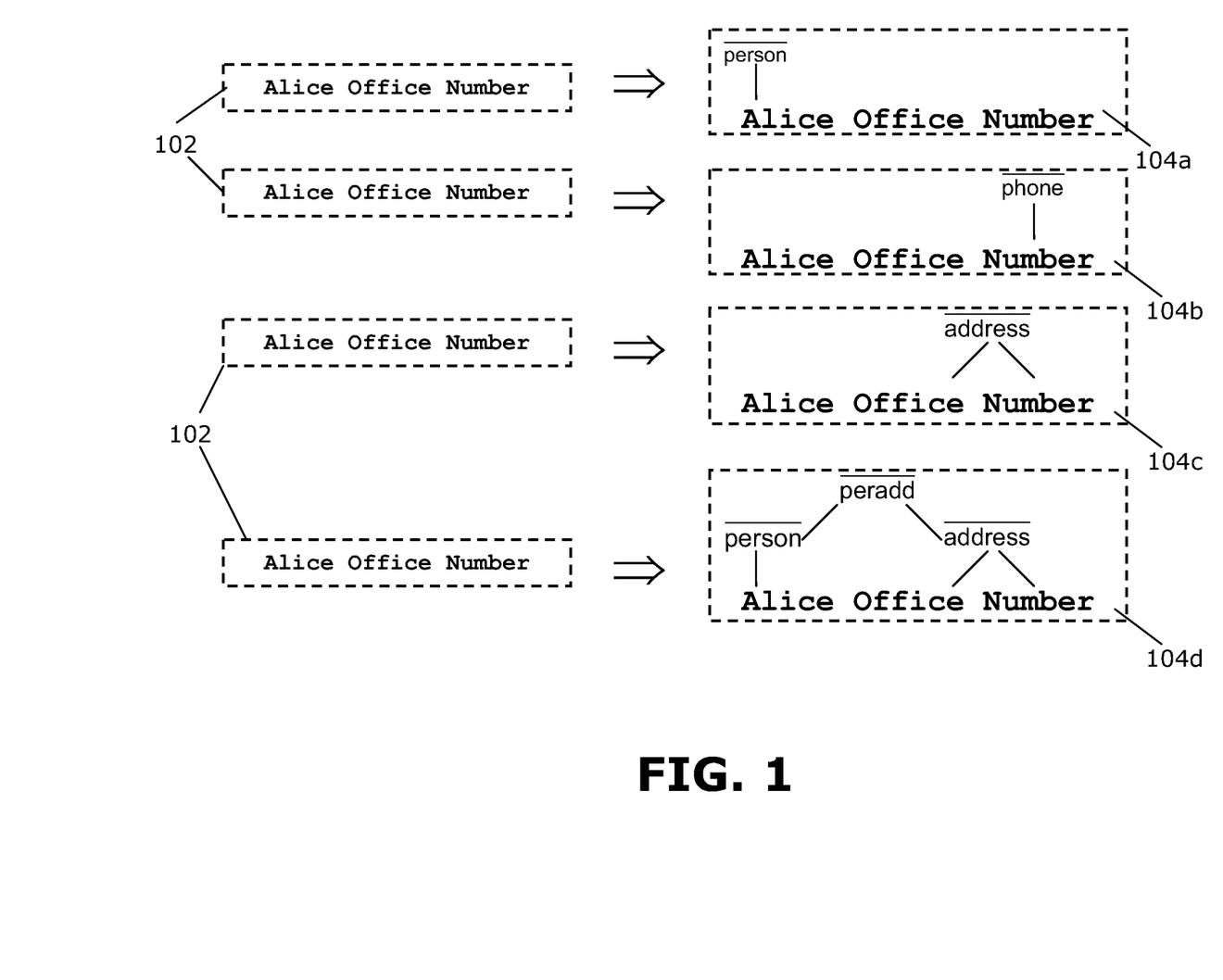
FIG. 1 schematically illustrates interpretations of a sample query.
Figure 2:
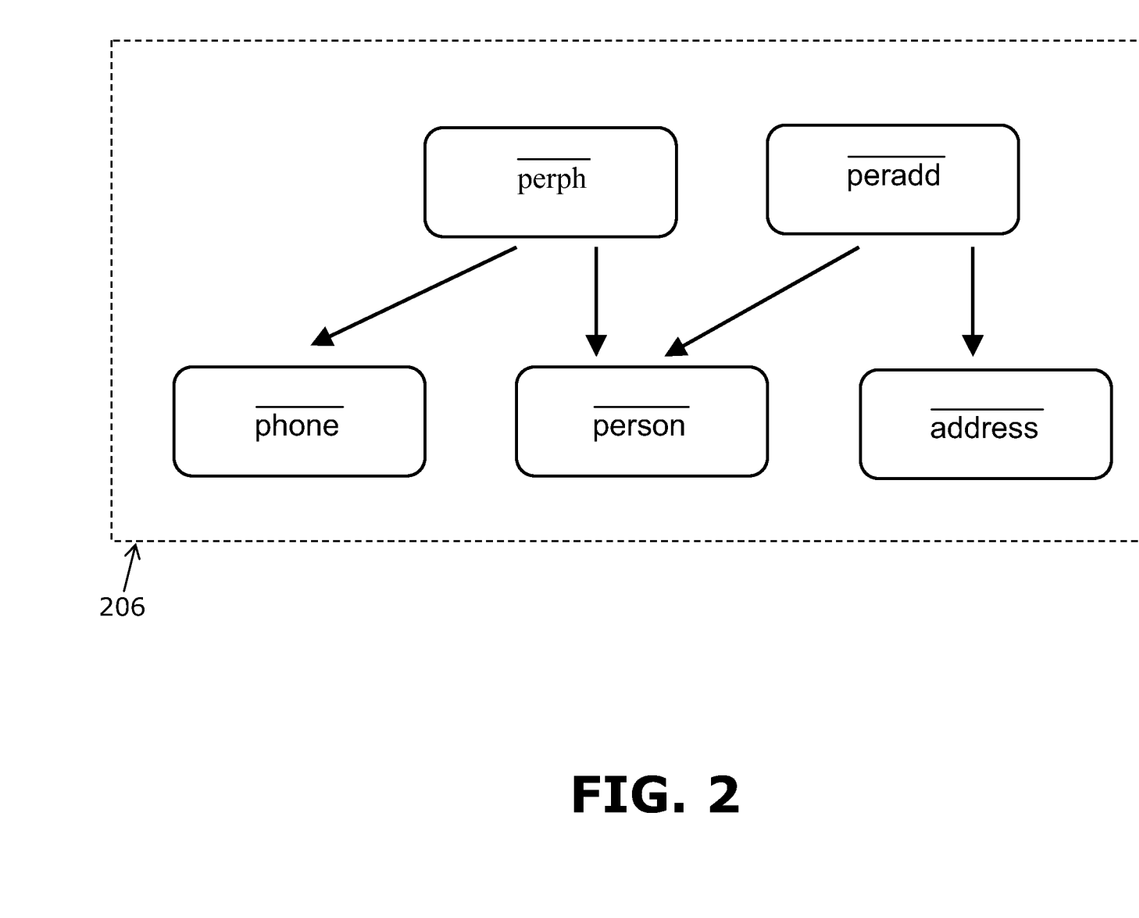
FIG. 2 illustrates a portion of a schema for the example of FIG. 1.
Figure 3:
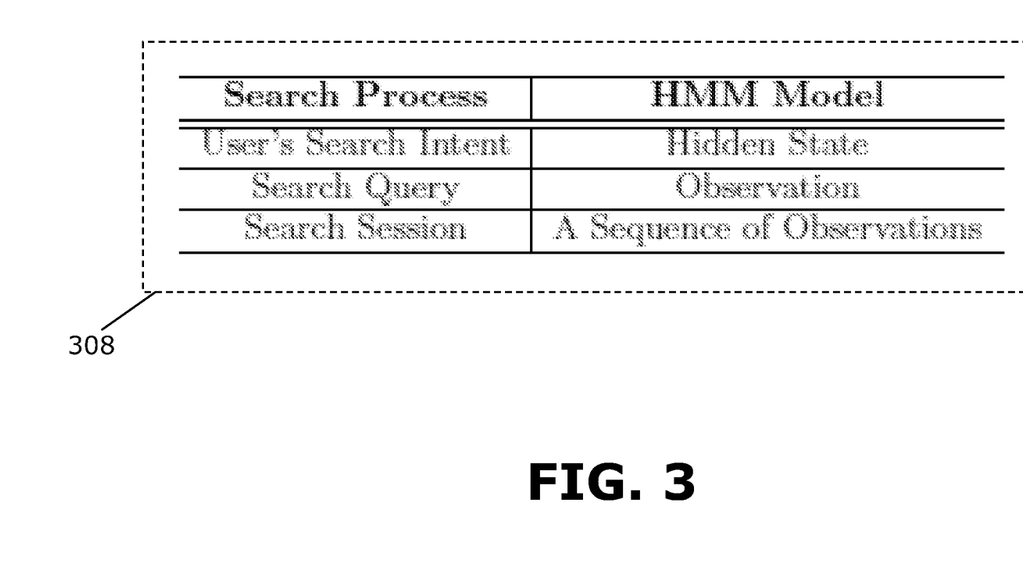
FIG. 3 sets forth a table which summarizes a correspondence between different quantities in a typical search process and quantities in a typical Hidden Markov Model.

The disclosure now turns to FIGS. 1-3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

In the context of at least one embodiment of the invention, auxiliary data can be supplied in the form of a library of concepts, instantiations of each of these concepts, and a library of meta-concepts, known as schema. A given keyword query is transformed into many templates based on these concepts and schema, and each one of them is known as hedge expression. Further, there is a library of rewrite rules which suggests the transformation of a given hedge expression into some other hedge expression(s). Thus, whenever a keyword query Q is encountered by such a system, it first maps it to various hedge expressions and then applies various rewrite rules in order to transform these hedge expressions into other hedge expressions that may better interpret the query. Based on these transformed hedge expressions, different rewrites of the original query are generated and they are finally used to search against the indexed documents. The library of rewrite rules can be initially populated manually by tapping in domain experts' knowledge. However, conventional efforts have fallen short in their efficacy in population such a library, and automated solutions have been elusive.

In accordance with at least one embodiment of the invention, there are broadly contemplated herein methods and arrangements that greatly facilitate automatically populating a library of query rewrite rules. Particularly proposed herein is Hidden Markov Model (HMM) based approach for automatic discovery of good quality query rewrite rules, by making use of query logs and click logs.

In the context of at least one embodiment of the invention, the following illustrative example can help define problems to be addressed. Consider a scenario of intranet search for a company, where, the profiles of all employees are searchable over the company's intranet. These records are semi-structured. Therefore, a query rewrite rule such as the following could be asked by the intranet administrators: "Whenever a query involves the name of a person and a word such as 'contact', 'profile', 'phone' or 'email', the search engine should generate an interpretation that looks for the person's name within the company's internal employee directory." Similarly, a query rewrite rule can be submitted such that any query of the form "download" or "install", followed by the name of some software, should generate an interpretation that looks for the name of this software within the company's internal software download Web site. Thus, query rewrite rules essentially serve as mechanisms that facilitate generation of such intent-based interpretations of the queries for the purpose of improving user experience.

However, in accordance with the present illustrative example, it can be appreciated that a major challenge may arise in being able to generate a large number of good-quality, or reliable, rewrite rules. Note that the process of manually generating the rewrite rules has its own limitations. Therefore, a viable challenge can be presented in discovering query rewrite rules automatically and, as will be appreciated more fully herebelow, this challenge is admirably addressed in accordance with at least one embodiment of the invention.

In accordance with at least one embodiment of the invention, consider a query Q given by "Alice Office Number". FIG. 1 illustrates four possible interpretations of this query (102). In a first interpretation 104a, the word "Alice" has been replaced by a concept called "person". Similarly, in a second interpretation 104b, the word "Number" has been replaced by another concept called "phone". In a third interpretation 104c, "address" emerges as a one-level meta-concept for the phone number in question. Finally, in a fourth interpretation 104d, both concepts, namely "person" and "address", have been jointly replaced by a meta-concept called "peradd" (abbreviation for person-address). Thus, a given user query can be interpreted in many ways by means of replacing different query terms with matching concepts (or meta-concepts).

Therefore, in accordance with at least one embodiment of the invention, any given interpretation of a user query may contain one or more concepts and/or meta-concepts. Inasmuch as a schema can be defined as a compact representation of a collection of concepts as well as meta-concepts, FIG. 2 shows a portion of the schema for the example of FIG. 1. Schemas, as a hierarchy of concepts and meta-concepts, are domain-dependent and, for the purposes of discussion herein, it can be assumed that a schema is readily available for a specific domain from which user queries may arise. Here, "perph" is a meta-concept for a person's phone number.

In accordance with at least one embodiment of the invention, a rewrite rule can now be defined. A simplifying assumption can first be made that that a schema contains just flat concepts and no meta-concepts. (This assumption is merely made for a purpose of illustrating mapping between a search process and an HMM model; the assumption can be alleviated with little difficulty in practice.) In this situation, a rewrite rule is an expression of the form A $\Rightarrow$ B where A and B are concepts in the schema. In view of this definition of rewrite rules, it can be appreciated that at least the following problem may now be addressed: "Given a schema, query logs, and click logs from a specific domain, how does one discover high quality rewrite rules in an automated manner".

In accordance with at least one embodiment of the invention, a first-order Hidden Markov Model (HMM) is employed for the purpose of modeling users' search behavior. It is assumed, in connection therewith, that while searching for any type of information, a user has some intent in his/her mind and tries to pass on that intent to the search system by way of submitting, or "firing", a sequence of queries. On the other hand, the search system builds an impression about a user's search intent (ostensibly "hidden" in a user's mind), based on what queries have already been issued by the user, and renders the search results accordingly. Thus, contemplated herein is a modeling of the search system's perspective about a user's search intent as an HMM, where hidden states of the Markov chain represent the intent that user might have in his/her mind and the observations represent the queries issued by him/her. As a user issues more and more queries, the states of the underlying Markov chain evolves towards a better reflection of the user's search intent.

FIG. 3 provides a table 308 which summarizes a correspondence between different quantities in a typical search process and quantities in a typical HMM model. To formalize the concept here, the following notations are employed:

$\mathbb{S} = \{S_1, S_2, \ldots, S_N\}$ denotes the set of N hidden states of the model where each state corresponds to one possible search intent of a user.

$Q = \{Q_1, Q_2, \ldots Q_M\}$ denotes the set of M observations where each observation corresponds to a search query fired by a user.

$A=\{a_{ij}\}$ is a state transition probability matrix (which also can be referred to as a state transition matrix) where, for each $1 \le i, j \le N$:

$$a_{ij} = P[X_{t+1} = s_j | X_t = S_i]$$

$$0 \le a_{ij}$$

$$\sum_{j=1}^{N} a_{ij} = 1$$

In accordance with at least one embodiment of the invention, in the above formulation, $X_t$ is a discrete random variable that denotes the hidden state of the underlying Markov chain at time epoch t. Also:

$B=\{b_i(Q_j)\}$ is query observation probability matrix (which can also be referred to as an emission probability matrix), where for each $1 \le i \le N$ and $1 \le j \le M$:

$$b_i(Q_j) = P[\text{Observing } Q_j \text{ at time } t | X_t = S_i]$$

$$0 \le b_i(Q_j)$$

$$\sum_{j=1}^{M} b_i(Q_j) = 1$$

$\pi=\{\pi_i\}$ denotes the initial state probability distribution where for each $1 \le i \le N$:

$$\pi_i = P[X_1 = s_i]$$

$$0 \le \pi_i$$

$$\sum_{i=1}^{N} \pi_i = 1$$

In accordance with at least one embodiment of the invention, the present HMM is augmented by introducing the notion of click event at each query observation. That is, for every observation, either click may happen or may not happen. "Click" can be understood to refer here to an event in which a user clicked on one of the search result shown to him/her against his/her query. Inclusion of this event renders the present augmented HMM as a triply stochastic process, as opposed to a classical HMM, which is merely a doubly stochastic process. In the present augmented HMM, one can view an observation as a pair comprising a query and a click event. In other words, an observed query Q now becomes either (Q, 0), if there is no click, or (Q, 1), if there is a user click. For this augmented observation field of click event, a probability distribution is introduced here, and can be referred to as a click acquisition probability (CAP) distribution. The CAP distribution is denoted by $C=\{c_i(Q_j)\}$ where, for each $1 \le i \le N$ and $1 \le j \le M$:

$c_i(Q_j) = P[\text{Click happens}|\text{Observing } Q_j \text{ at } t \text{ and } X_t = s_i]$ $0 \le c_i(Q_j) \le 1$ In view of above notations, an augmented HMM model can be denoted by the following tuple:

$$\lambda = (A, B, C, \pi) \quad (1)$$

In accordance with at least one embodiment of the invention, the disclosure now turns to the training of an HMM such as that discussed hereinabove, a given query and click logs. Further, there is proposed a manner of inferring top rewrite rules from trained HMM model.

Thus, in accordance with at least one embodiment of the invention, let it be assumed that there are L training sessions, denoted by $\Omega = \{O^{(1)}, O^{(2)}, \ldots, O^{(L)}\}$, where each training session $O^{(k)}$ is a sequence of queries with those query marked separately that fetched a click. That is, $O^{(k)} = \langle Q_1^{(k)}, Q_2^{(k)}, \ldots Q_{l_k}^{(k)} \rangle$, where $l_k$ denotes the length of the session $O^{(k)}$. Any of a wide variety of approaches can be used to train an HMM. As such, for a single session $O^{(k)}$, the parameters A, B, and $\pi$ of an HMM model can be obtained by using any of a wide variety of algorithms. (A non-restrictive and illustrative example of one, known as the Baum-Welch algorithm, and which is essentially an EM [expectation-maximization] algorithm, can be found in L. Baum, T. Petrie, G. Soules, and N. Weiss, "A maximization technique occurring in the statistical analysis of probabilistic functions of markov chains", *Annals of Mathematical Statistics* 41(1):164-171, 1970.)

In accordance with at least one embodiment of the invention, the Baum-Welch algorithm is extended to additionally accommodate the CAP parameter discussed herein. Particularly, this is done to more readily accommodate multiple observation sequences (or sessions), which may arise in view of searches being performed by different users, as opposed to a single observation sequence. To the extent that such multiple sequences may be independent, the A, B and $\pi$ parameters may be learned via a suitable arrangement for training HMM's with multiple observations, with allowances made for such independence. A non-restrictive and illustrative example of such a suitable arrangement may be found in X. Li, M. Parizeau, and R. Plamondon, "Training hidden markov models with multiple observations—a combinatorial method", IEEE Transactions on PAMI, 22(4):371-377, April 2000. By way of this non-restrictive example, the estimated parameters A, B and $\pi$ can be given by way of the following parameter update equations:

$$\bar{a}_{ij} = \frac{\sum_{k=1}^{L} \sum_{t=1}^{l_k - 1} \xi_t^{(k)}(i, j)}{\sum_{k=1}^{L} \sum_{t=1}^{l_k - 1} \psi_t^{(k)}(i)} \forall 1 \le i, j \le N \quad (2)$$

$$\bar{b}_i(Q_j) = \frac{\sum_{k=1}^{L} \psi_t^{(k)}(i) 1_{Q_t^{(k)} = Q_j}}{\sum_{k=1}^{L} \sum_{t=1}^{l_k} \psi_t^{(k)}(i)} \forall 1 \le i \le N, 1 \le j \le M \quad (3)$$

$$\bar{\pi}_i = \frac{1}{L} \sum_{k=1}^{L} \psi_1^{(k)}(i) \forall 1 \le i \le N \quad (4)$$

where state variables $\psi_t^{(k)}(i)$ and joint events $\xi_t^{(k)}(i,j)$ can be evaluated by applying the Baum-Welch algorithm independently on observation sequences in the session $O^{(k)}$, treating that session as a single observation sequence. Further, this can be formally stated as follows, when $1 \le k \le L$; $1 \le i \le N$:

$$\psi_t^{(k)}(i) = \sum_{j=1}^{N} \xi_t^{(k)}(i, j) \quad (5)$$

$$\xi_t^{(k)}(i, j) = P[X_t = S_i, X_{t+1} = S_j \mid O^{(k)}, \lambda] \qquad (6)$$

The quantity $1_{Q_t^{(k)}=Q_j}$ is an indicator variable having value 1 if the $t^{th}$ observation in the $k^{th}$ session is the same as $Q_j$, and 0 otherwise. The CAP can be learned using an algorithm such as a standard EM-type algorithm.

In accordance with at least one embodiment of the invention, after training an extended HMM, $\lambda=(A, B, C, \pi)$, rewrite rules can be inferred. In an HMM framework herein, a typical rewrite rule can be defined as $S_i \rightarrow S_j$ where $S_i, S_j \in \mathbb{S}$ and, $S_i$ is an "antecedent" and $S_j$ is a "consequent". For a rewrite rule $S_i \rightarrow S_j$, the support of this rule, denoted by $\sigma(S_i \rightarrow S_j)$ can be defined as now follows.

In accordance with at least one embodiment of the invention, with $\lambda=(A, B, C, \pi)$ as an extended HMM, let $S=\langle S_{(1)}, S_{(2)}, \ldots, S_{(l)} \rangle$ be a sequence of Markov chain states (of length l), where $S_{(v)} \in \mathbb{S}$ $\forall v=1, 2, \ldots, l$. Then, support of a given rewrite rule $S_i \rightarrow S_j$ can be expressed as:

$$\sigma(S_i \rightarrow S_j) = \underset{S}{\text{maximize}} P[S_i S S_j \mid \lambda] \qquad (7)$$

In other words, the support of a rewrite rule is the highest probability computed over all the state transition sequences starting from state $S_i$ and ending at state $S_j$. The following notion convention can also be used for such an optimal sequence:

$$S_{ij}^* = \underset{S}{\text{argmax}} P[S_i S S_j \mid \lambda] \qquad (8)$$

As such, sequence $S_{ij}^*$ can be referred to as the supporting sequence for the rewrite rule $S_i \rightarrow S_j$.

Further, in accordance with at least one embodiment of the invention, the above definition of support can be augmented by taking into account the click event. A definition for click-based support can thus be defined as now follows. With $\lambda=(A, B, C, \pi)$ as an extended HMM, let $S=\langle S_{(1)}, S_{(2)}, \ldots S_{(l)} \rangle$ be a sequence of Markov chain states (of length l), where $S_{(v)} \in \mathbb{S}$ $v=1, 2, \ldots, l$. Then, click-based support of a given rewrite rule $S_i \rightarrow S_j$ can be expressed as:

$$\sigma_c(S_i \rightarrow S_j) = \underset{S}{\text{maximize}} P[S_i S S_j \mid \lambda](1 - c_i)c_j \prod_{k=1}^{l}(1 - c_{i_k}) \qquad (9)$$

where $$c_i = \sum_{j=1}^{N} c_i(Q_j)$$

is the probability of receiving a click when the hidden state of the Markov chain is $S_i$.

In view of above definitions, in accordance with at least one embodiment of the invention, an approach for rule inference is contemplated, as follows. For every state $S_i$, a top k consequent states $S_{i_1}, S_{i_2}, \ldots, S_{i_k}$ are computed in such a way that they are the top k consequent states maximizing the support function (7) for the given antecedent state $S_i$. Function (9) can also be used instead of (7). (In this vein, a quality of learned rules can improve if function [9] is used as opposed to function [7]; however, a statistically sufficient number of click events should be present to warrant the heightened usefulness of function [9] over function [7].) This will provide the top k rewrite rules for every possible antecedent state $S_i$ of the underlying Markov chain.

In accordance with at least one embodiment of the invention, the top k rewrite rules can be leveraged for query rewrite. Particularly, inasmuch as a library of rewrite rules is to be populated in an automated manner for programmable search, a decision-making layer of the programmable search can decide, on the fly, which rewrite rules should be triggered and which should not. Such a decision can be based on any of a variety of possible constraints, e.g., priority levels between manual rules and automatically discovered rules, as may be pre-specified by domain experts.

In order to compute the top k rewrite rule for every possible antecedent state $S_i$, in accordance with at least one embodiment of the invention, a dynamic programming-based algorithm is employed as now to be described. Particularly, the algorithm seeks to discover an optimal consequent state $S_j$ for a given antecedent state $S_i$, whereby the support function (7) comes to be maximized.

As such, in accordance with at least one embodiment of the invention, it can be seen that the present problem exhibits overlapping subproblems as can be encountered in dynamic programming. Particularly, suppose that $S_j$ is the optimal consequent state for the antecedent state $S_i$. Let $S_{ij}^*=\langle S_{(1)}, S_{(2)}, \ldots S_{(l)} \rangle$ represent the corresponding supporting sequence for the rewrite rule $S_i \rightarrow S_j$. At the same time, let $S_x$ and $S_y$ represent two different states in the sequence $S_i S_{ij}^* S_j = \langle S_i, S_{(1)}, \ldots, S_x, S_{xy}, S_y, \ldots, S_{(l)}, S_j \rangle$, such that $S_x$ appears before $S_y$. It can then be appreciated that $S_{xy}$ would represent the supporting sequence for the rewrite rule $S_x S_y$; that is:

$$S_{xy} = S_{xy}^* = \underset{S}{\text{argmax}} P[S_x S S_y \mid \lambda] \qquad (10)$$

In accordance with at least one embodiment of the invention, in view of the above-discussed overlapping subproblem property, it is apparent that a dynamic programming-type algorithm can be developed for the present problem. It can be appreciated that the problem of inferring a top k rewrite rules can be reduced to a problem of all-pair shortest path. This can be illustrated by starting with expression (7) for the support of a rewrite rule and performing certain algebraic manipulations as now to be described. Thus:

$$\sigma(S_i \rightarrow S_j) = \underset{S}{\text{maximize}} P[S_i S S_j \mid \lambda] \qquad (11)$$
$$= \underset{S=\langle S_{(1)}, S_{(2)}, \ldots S_{(l)} \rangle}{\text{maximize}} a_{i(1)} a_{(l)j} \prod_{k=1}^{l} a_{(k)(k+1)}$$

where equation (11) follows from a Markov property. It can be noted that the optimization problem stated in the right-hand side of equation (11) can be expressed in an alternative manner, as follows. Particularly, instead of maximizing probability, the log-likelihood score is minimized:

$$\underset{\langle S_{(1)}, S_{(2)}, \ldots S_{(l)} \rangle}{\text{minimize}} - \left[ \log(a_{i(1)}) + \log(a_{(l)j}) + \sum_{k=1}^{l} \log(a_{(k)(k+1)}) \right] \quad (12)$$

It can be seen, in continuing to consider the context and functioning of at least one embodiment of the invention, that the above expression has an interesting interpretation in graph theory. Particularly, if a directed graph G=(S,E) is considered, whose vertex set is the same as the set of hidden states of the Markov chain, and there is a directed arc from every vertex $S_i$ to any and all other vertices $S_j$ having an edge weight of $-\log(a_{ij})$, which would be a non-negative number. In view of such a graph, the log-likelihood minimization problem (12) is the same as finding a shortest path from vertex $S_i$ to $S_j$. In view of this observation, it can be said that rewrite rules can be inferred by solving an all-pairs shortest path problem on the graph G=(S,E), and by outputting the destinations vertex of the top k shortest paths starting from node $S_i$ for every $S_i \in \mathbb{S}$. For the all-pairs shortest path problem, well-known conventional algorithms such as the Floyd-Warshall algorithm and Johnson algorithm can be employed.

Figure 4:
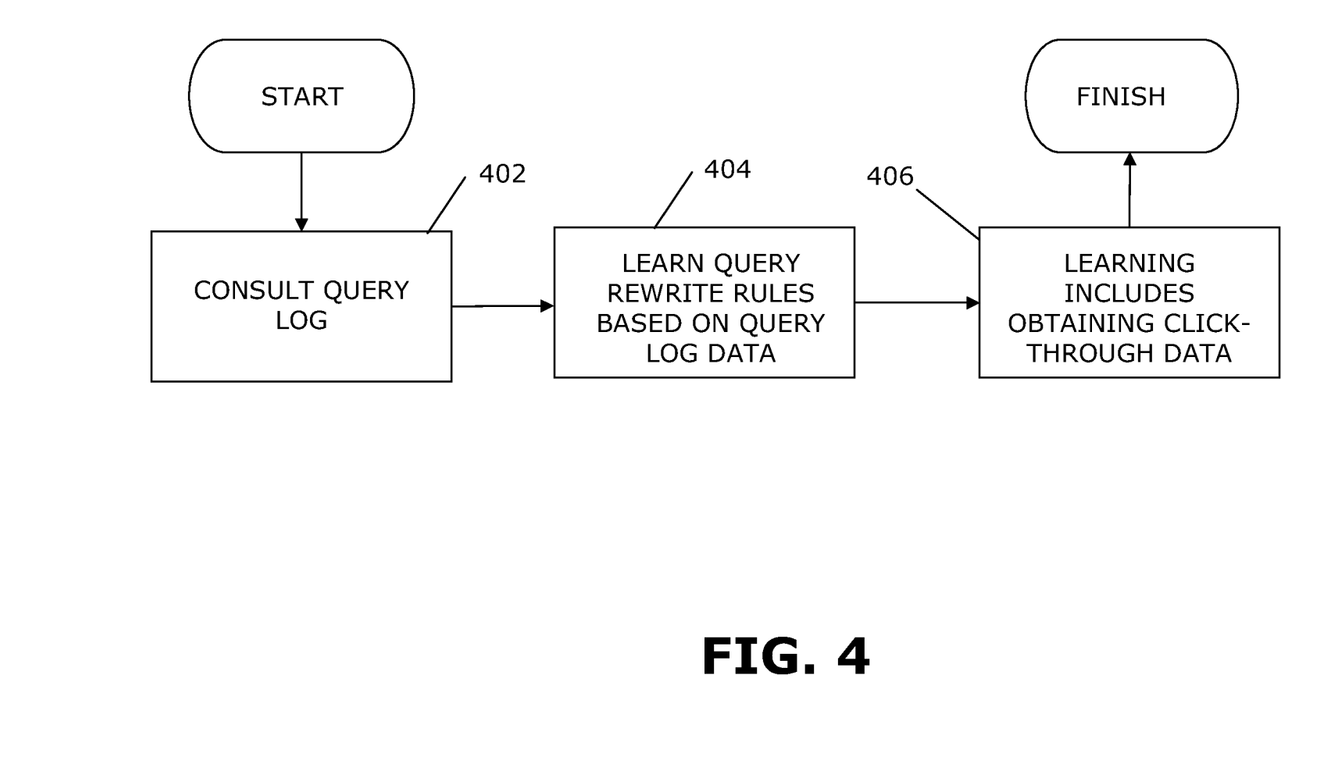
FIG. 4 sets forth a process more generally for conducting a search using query logs.

FIG. 4 sets forth a process more generally for conducting a search using query logs, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12' in FIG. 5. In accordance with an example embodiment, most if not all of the process steps discussed with respect to FIG. 4 can be performed by way a processing unit or units and system memory such as those indicated, respectively, at 16' and 28' in FIG. 5.

As shown in FIG. 4, a query log is consulted (404) and query rewrite rules are learned automatically based on data in the query log (406). The learning includes obtaining click-through data present in the query log (408).

Figure 5:
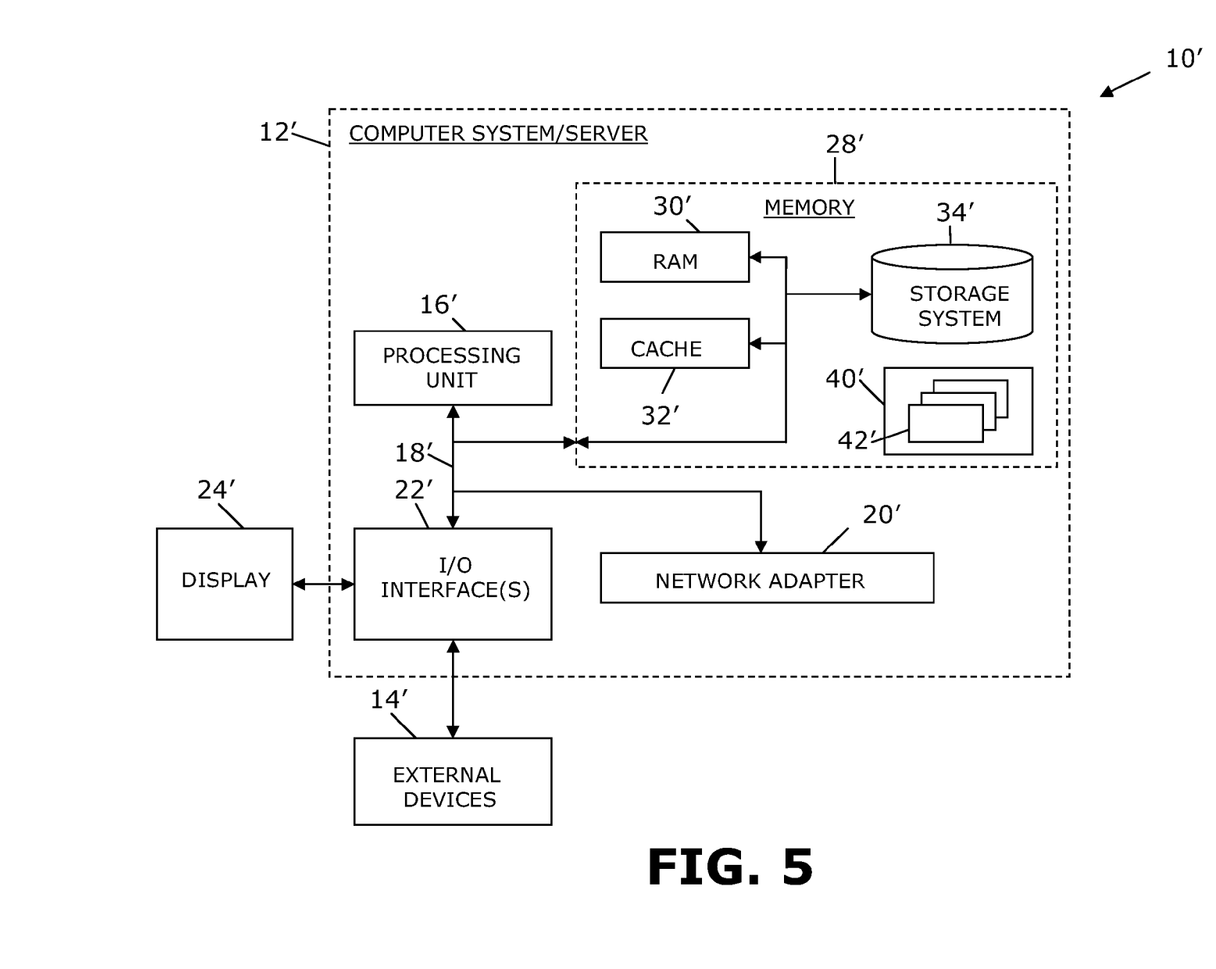
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   automatically populating a library of query rewrite rules utilizing a Hidden Markov Model based approach;
   employing a first-order Hidden Markov Model to model a user's search behavior by consulting a query log;
   automatically learning query rewrite rules based on data in the query log;

employing an augmented Hidden Markov Model to learn via obtaining click event data at each query observation via employing a click acquisition probability metric;

the click acquisition probability metric representing a probability of a click occurring when observing a query, at a given time epoch, relative to a given hidden state of an underlying Markov chain; and automatically learning query rewrite rules by making use of data in the query logs and click logs.

2. The method according to claim 1, wherein:
said learning comprises a first learning pass and a second learning pass;
said first learning pass comprising obtaining data other than click event data present in the query log;
said second learning pass comprising obtaining click event data present in the query log.

3. The method according to claim 2, wherein said first learning pass comprises applying the first-order Hidden Markov Model.

4. The method according to claim 3, wherein said first learning pass comprises defining at least one Hidden Markov Model aspect taken from the group consisting of: hidden states; observations; significance of probabilities.

5. The method according to claim 2, wherein said first learning pass comprises obtaining requirements of learning search run-time rules via employing at least one taken from the group consisting of: query log data; manually written search runtime rules.

6. The method according to claim 2, wherein the data other than click-through data comprise at least one taken from the group consisting of: query sequences; query session information.

7. The method according to claim 2, wherein the click event data comprise at least one taken from the group consisting of: click-through information; analytics on click-through documents.

8. The method according to claim 2, wherein said second learning pass comprises employing the click acquisition probability metric.

9. The method according to claim 8, wherein:
said learning comprises applying a Hidden Markov Model;
wherein said applying of a Hidden Markov Model comprises employing the click acquisition probability metric.

10. The method according to claim 2, wherein said learning further comprises combining data from said first learning pass and said second learning pass, based on probabilistic criteria.

11. The method according to claim 10, wherein said learning further comprises developing a ranked list of inferred query rewrite rules.

12. The method according to claim 1, further comprising:
receiving a search query by a user; and
consulting the query rewrite rules and thereupon reframing the search query.

13. The method according to claim 1, wherein said learning is performed offline.

14. The method according to claim 1, wherein the click-through data comprise historical click-through data.

* * * * *